Aug. 17, 1937. N. BRENHOLM Re. 20,468

JACK HAMMER BIT

Original Filed April 15, 1935

Inventor

Nels Brenholm

By Clarence A. O'Brien
Hyman Berman

Attorneys

Reissued Aug. 17, 1937

Re. 20,468

UNITED STATES PATENT OFFICE 20,468

JACK HAMMER BIT

Nels Brenholm, Stevenson, Wash., assignor of one-third to R. M. Wright, Stevenson, Wash., and one-third to George Guyette, Cook, Wash.

Original No. 2,040,074, dated May 12, 1936, Serial No. 16,524, April 15, 1935. Application for reissue June 24, 1937, Serial No. 150,179

1 Claim. (Cl. 255—64)

This invention relates to drill bits and more particularly to bits especially designed for operation by a jack hammer.

An object of the present invention is to provide a bit of this character characterized by such a construction that in operation, the bit at all times will be kept clear and free from cuttings and, consequently, will not choke or stick.

Briefly, the invention consists in the provision of a jack drill bit provided with multiple wings or blades with cutting edges which are spiral and also having an air passage therethrough and opening outwardly in such relation to the blade to insure such a cooperation with the blades that the cuttings or particles are easily reduced to dust and expelled from the hole by the force of air or water passing from the passage in the bit.

The invention together with its objects and advantages will be best understood from a study of the following description taken in connection with the accompanying drawing wherein:—

Figure 1:
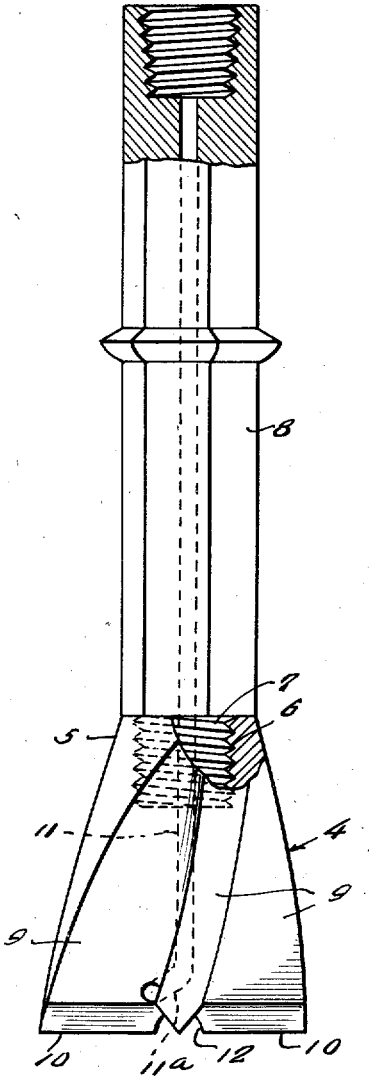
Figure 1 is a view mostly in elevation of the bit, and with parts broken away and shown in section.

Referring to the drawing by reference numerals it will be seen that the bit indicated generally by the reference numeral 4 has a somewhat tapered head portion 5 merging into a somewhat flared body portion, the head portion 5 being provided with threaded socket 6 for the reception of the threaded pin 7 provided on one end of the usual drill steel or shank 8, the latter forming no part of the present invention.

Further in accordance with the present invention the drill 4 is provided with multiple wings or blades 9 which are spiral in form making the blades tapered and slanting, as shown. As illustrated the blades 9 have a spiral twist clockwise from the top of the bit, which, as will be clear to those skilled in the art, is counter to the direction in which the bit operates, it being understood that in jack hammer drills the bit is driven in a counterclockwise direction or rotation.

As also apparent from the drawing, the blades 9 form between them spiral grooves progressively increasing in width from the top to the bottom of the bit with the spiral of the grooves corresponding to the spiral of the blades 9.

Figure 2:
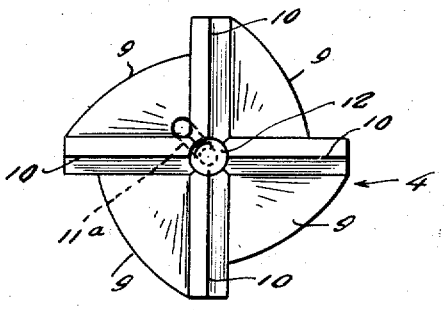
Figure 2 is a bottom plan view of the bit.

Also, in accordance with the present invention, and as shown, the cutting edges or points 10 of the blades project slightly beyond or in advance of the bottom of the bit and are beveled. At the inner ends of the points 10 of the bit and as best shown in Figure 2 the bottom of the bit is provided with a central depression 12 serving as a guide hole of indentation in the center of the bottom of the bit.

Also, axially through the center of the bit is a passage 11 which slightly upwardly from the bottom of the bit extends laterally and at a downwardly incline as at **11*a* to open through the trailing or following face of one of the blades 9 to the end that the air or water through the passage will discharge through the end 11*a* thereof in such a manner to cooperate with the blades for insuring the expelling of the dust-ground cuttings from the hole by the force of air or water, as the case may be, issuing from the outlet end 11*a*** of the passage.

The object of the spiral blades, and in having the spiral twist clockwise from the top to the bottom of the bit is that, the drill operating in a counterclockwise direction, any particles of rock or mulk having a tendency to gather above the cutting edges 10 are worked back under the cutters by passing down the grooves with the result that the particles or cuttings will be ground practically to dust thereby preventing choking or sticking of the drill.

It will be apparent that a bit of this character will tend to efficiently force particles of the work or cuttings downward to be crushed and pulverized by the action of the points or edges 10 of the blades and in such a crushed pulverized state to be expelled from the hole by the force of the water or air issuing from the passage 11, and as such a spiral arrangement of the grooves and blades will insure, as above pointed out, against the choking and sticking of the bit while in operation.

Having thus described the invention, what is claimed as new is:—

A bit for use with jack hammer drills adapted to be rotated normally in a counterclockwise direction, said bit having a multiplicity of integral spiral blades twisting clockwise from the top to the bottom of the bit and providing in alternation with the blades grooves having a spiral twist corresponding to the spiral twist of the blades, said bit also including a passage extending longitudinally of the bit and opening laterally through one of the trailing faces of one of said blades, and said blades having cutting edges disposed slightly lower than the central part of the lower surface of the bit, said cutting edges being beveled.

NELS BRENHOLM.